imary Examiner—Paul R. Michl
Assistant Examiner—N. Sarofim
Attorney, Agent, or Firm—Curtis, Morris & Safford

United States Patent [19]
Kirby et al.

[11] Patent Number: 4,525,511
[45] Date of Patent: Jun. 25, 1985

[54] METHOD AND COMPOSITIONS FOR IMPROVING BONDING TO PAINTED SURFACES

[75] Inventors: Michael D. Kirby, Lakewood; Michael P. Mazzeo, Hightstown, both of N.J.

[73] Assignee: Essex Specialty Products, Inc., Sayreville, N.J.

[21] Appl. No.: 597,533

[22] Filed: Apr. 6, 1984

[51] Int. Cl.³ .............................................. C08K 5/42
[52] U.S. Cl. ................................... 524/158; 524/417; 524/422; 524/557; 525/56
[58] Field of Search .............. 524/158, 557, 422, 417; 525/56

[56] References Cited

U.S. PATENT DOCUMENTS

| | | | |
|---|---|---|---|
| 2,613,195 | 10/1952 | Craig | 524/158 |
| 2,991,262 | 7/1961 | Johnston | 524/557 |
| 3,248,271 | 4/1966 | Rielly et al. | 156/2 |
| 3,644,257 | 2/1972 | Nickerson et al. | 524/422 |
| 3,822,142 | 7/1974 | Arntson | 524/422 |
| 3,862,071 | 1/1973 | Di Carlo | 260/29.4 VA |
| 3,953,643 | 4/1976 | Cheung et al. | 428/220 |
| 3,953,644 | 4/1976 | Camelon et al. | 428/220 |
| 4,046,733 | 9/1977 | Smith et al. | 524/158 |
| 4,258,163 | 3/1981 | Mariasi et al. | 525/56 |
| 4,264,643 | 4/1981 | Granata et al. | 427/44 |
| 4,297,448 | 10/1981 | Chang et al. | 525/162 |
| 4,425,384 | 1/1984 | Brownscombe | 524/505 |

FOREIGN PATENT DOCUMENTS

| | | | |
|---|---|---|---|
| 467920 | 9/1950 | Canada | 524/158 |
| 506415 | 10/1954 | Canada | 524/557 |
| 200087 | 3/1983 | Fed. Rep. of Germany | 524/557 |
| 53-65488 | 6/1978 | Japan | 524/557 |
| 57-12078 | 1/1982 | Japan | 524/557 |

OTHER PUBLICATIONS

Kuhn et al., "High Solids Acrylic Resins for Baking Enamels", Modern Paint and Coatings, pp. 50–53, Apr. 1981.
Calbo, "Effect of Catalyst Structure on the Properties of Coatings Crosslinked with Hexa(Methoxymethyl)-Melamine", 14th Symposium Western Coating Societies, San Francisco, Feb. 28–Mar. 2, 1979.
"Catalysis of Amino Cross–Linking Agents, Part I, Theoretical", Resin News (a publication of the American Cyanamid Company), No. 5, Jul. 1977.

Primary Examiner—Paul R. Michl
Assistant Examiner—N. Sarofim
Attorney, Agent, or Firm—Curtis, Morris & Safford

[57] ABSTRACT

A method for priming a high solids enamel automotive finish to improve the adhesion thereto of a sealant composition, which method comprises treating said surface with a strong acid, conveniently by applying a primer composition to said surface, said primer composition comprising a solution, in a volatile organic solvent, of a hydroxy functional film forming resin and at least 0.25 percent of a strong acid, by weight of said resin.

5 Claims, No Drawings

METHOD AND COMPOSITIONS FOR IMPROVING BONDING TO PAINTED SURFACES

The present invention relates to a method for priming a substrate surface to increase the adhesion of a sealant composition to said surface, to primer compositions for performing such a method, and to the primed surfaces prepared by the method.

The imposition in recent years of federal regulations mandating improved fuel economy in automobiles, as well as federal regulations governing windshield retention on frontal impact and roof crush requirements, have led to a widespread use in the industry of urethane sealants for sealing fixed glass such as windshields and backlights in autobodies. Such urethane sealants have high tensile strengths and tear strengths, good elogation to break and, by permitting firm bonding of windshields into the auto body, thus imparting structure to the body, have permitted a decrease in the amount of metal employed (with a resulting loss in weight and reduced fuel consumption) without loss in strength.

However, urethane sealants by themselves will not bond glass to metal with a permanent enough bond to pass the stringent environmental tests which are imposed by automotive specifications. Numerous primer compositions have been developed, many containing hydrolyzable alkoxysilane groups, for instance, which improve the quality of the bond between the polyurethane sealant and the surface of the glass which is to be mounted.

Further problems in forming good seals of fixed glass in the automotive industry have been caused by the recent introduction of so-called "high solids" enamels into the industry. These enamels have been developed in response to the need to reduce environmental pollution and are compositions in which large amounts of a thermosetting resin are dissolved, together with a hardener, at high concentrations in a volatile solvent. The reduced amount of solvent present in such "high solids" paints facilitates drying with a minimum of solvent release.

Since the introduction of these "high solids" enamels, the industry has been attempting to improve the bonding of urethane sealants to such surfaces. Because automotive assembly generally requires that such paints be applied and dried by baking prior to the mounting of fixed glass into the auto frame, systems must be developed for adhering urethane sealants to the painted auto bodies at room temperature.

According to the present invention, a method has been found for priming surfaces, particularly surfaces of dried "high solids" enamels to improve the bonding thereto of urethane sealants of the type now conventionally employed in industry for the mounting and adhering of glass thereto. More in particular, it has been found that an acid treatment of the paint surface will improve the adhesion thereto of a primer or tie coat, to which primer or tie coat the urethane sealant is then subsequently bonded. While such treatment of the paint surface with acid can be effected by means of an acid wipe, it is much more convenient to incorporate the acid within a primer or tie coat composition which then adheres, on the one hand, to the painted surface and, on the other hand, to the urethane sealant applied thereover as an adhesive for fixed glass.

It has been found according to the present invention that treatment of a "high solids" enamel surface with a strong acid, either inorganic or organic, improves the adhesion thereto of a primer or tie coat. Strong inorganic acids such as sulfuric acid, and particularly hydrochloric acid, are very effective for this purpose. While hydrochloric acid is particularly good from the point of view of improving adhesion, it is undesirable because of its corrosive or potential corrosive effects on metal. Less strong, but still useful, inorganic acids include phosphoric acid, for instance. Among the organic acids, the sulfonic acids are particularly desirable because of their strong acid properties. Organic carboxylic acids, on the other hand, because they are relatively weak acids, are less useful. Nevertheless, certain of these acids, such as acetic acid, can be used. Although the suitability of a particular acid can be readily determined without undue experimentation, it is noted that phosphoric acid, having a $pK_a$ of 2.9 for the first hydrogen atom, is at the limit of effectiveness for strong inorganic acids. Hence, it can be taken as a rule of thumb that acids having a $pK_a$ greater than 2.9 will probably not be useful in the present invention. However, it must be mentioned that according to the present invention the acids are employed in non-aqueous environments. Hence, it is difficult to correlate the significance of the $pK_a$ value with the suitability of a particular acid for use in the present invention.

As mentioned earlier, although the "high solids" enamel surfaces to be primed according to the present invention can be acid treated by wiping acid thereover prior to application thereto of the primer or tie coat to which a urethane sealant is subsequently to be bonded, it is more convenient from the point of view of application to incorporate the acid into the primer or tie coat itself.

The resins employed in the primers according to the present invention are film forming resins having functional groups capable of reaction with isocyanate groups in the urethane sealant, suitably hydroxy or hydroxy and carboxy groups. The resins often resemble, or in some cases may be identical with, the resins employed in the underlying enamels. Among the resin compositions which have proved particularly effective according to the present invention are partially hydrolyzed polymers of vinyl chloride or vinyl acetate which can be viewed as terpolymers of vinyl chloride, vinyl acetate, and vinyl alcohol. For example, suitable materials contain between about 80 and about 90 percent by weight of vinyl chloride, about 4–5 percent of vinyl acetate, the balance being vinyl alcohol such that the hydroxy content of the polymers is at least about 2 percent. Two commercially-available materials which have proved suitable for use according to the present invention are the copolymer resins sold under the tradename "VAGH" and "VAGD" having a content of vinyl chloride of approximately 90 percent, a content of vinyl acetate of 4 percent, and a hydroxy content of about 2.3 percent. A third similar material which is useful according to the present invention is sold under the tradename "VROH" and comprises 80 percent of vinyl chloride, 5 percent of vinyl acetate, and approximately 2 percent of hydroxy groups.

Another class of resins suitable for use according to the present invention are hydroxy functional acrylic resins such as those sold under the tradenames "OL-42", and "AT-410". These are polymers of esters of acrylic acid and methacrylic acid containing pendant hydroxyl groups. The resins may also contain carboxy functional monomers. The acrylic resins are available as solutions with concentrations between about 70 and 80 percent and hence are similar to the "high solids" paints to which they are applied.

The acids which are incorporated into the primers to improve their adhesion to the substrate to which they are applied are present in the resin compositions at a minimum of 0.25 percent (by weight of the resin to which they are added) for the strongest acid materials such as the organic sulfonic acids, HCl, and $H_2SO_4$. Weaker acids, such as acetic acid among the organic acids or phosphoric acid among the inorganic acids, are preferably used, respectively, at a minimum concentration of 3.0 or 1.5 percent, by weight of the resin. Expressed as moles of acid per kilogram of resin to which they are added, the concentration of acids employed thus varies from a minimum of about $5(10^{-3})$ for a material such as dinonylnaphthalene disulfonic acid to a minimum concentration of about $130(10^{-3})$ for phosphoric acid. The weaker acids are suitably present in a maximum concentration of about 10 percent, by weight of the resin, again depending on the strength and nature of the acid employed. This is not an absolute maximum for acid content: rather, this is a level at which such good results are obtained that there is little incentive to exceed the level.

The superiority of organic acids, particularly the organic sulfonic acids, when incorporated in primer compositions of the type described above may be attributable to their solubility in the organic vehicle in which they are present, as well as to their acid strength. The organic sulfonic acids are additionally desirable from the point of view of their relative lack of corrosiveness on surfaces to which they are applied. Paratoluene sulfonic acid has proved particularly useful according to the present invention from the point of view of its acid strength, solubility properties, lack of corrosion, and the small amounts in which it is effective when combined into a primer of the type described.

For the formulation of a primer composition according to the present invention, the resin and acid are suitably dissolved in a volatile solvent or solvent mixture at a concentration of the resin which permits ease of handling and application of the primer composition from the point of view of viscosity. Suitable solvents are those organic liquids which are volatile at room temperature, such as toluene or methylethyl ketone, for instance. In the solvents, the resins mentioned earlier herein can be conveniently incorporated to form a solution having a concentration between 10 and 35 percent. Generally, concentrations of about 20 percent are preferred. To modify or improve the coating properties of the formulation and to impart color, fillers such as clay and/or pigments such as carbon black may be added.

For use, the aforementioned primer compositions are applied to a substrate surface as a thin film, e.g. having a wet film thickness of about 5 mil (corresponding with a dry film thickness of about 1–2 mil). For thorough removal of the volatile solvent, the applied films are usually dried for at least about one half hour at room temperature. However, successful adhesion of a urethane sealant to such a primer coating has been effected after much shorter periods of drying, e.g. until the applied film of primer is dry to the touch.

The "high solids" enamel coatings to which the primer of the present invention is applied are like those described in U.S. Pat. No. 4,297,448 to Chang et al. The finishes are generally described as the reaction product of a low molecular weight (and hence highly soluble) hydroxy and/or carboxy functional acrylate resin with an aminoplast crosslinking agent such as a condensation product of formaldehyde with melamine, substituted melamine, urea, benzoguanamine, or substituted benzoguanamine. Preferred materials are the methylated melamine formaldehyde materials such as hexamethoxymethylmelamine. Numerous polymer compositions and crosslinking agents are disclosed in the aforementioned Chang et al. patent.

As also disclosed in the Chang et al. patent, the high solids enamel compositions disclosed above may or may not contain a catalyst. However, the inclusion of a strong acid, such as paratoluene sulfonic acid or phosphoric acid esters, in small amounts, permits a lowering of the film baking temperature or curing time.

Normally, such paint compositions are applied wet to a metal surface to be coated and the solvent is permitted to flash off. The coated surface is then heated to about 125° C.

The polyurethane sealants which are bonded to the surfaces which have been primed in the manner described above with an acid-containing primer or tie coat are generally one-component sealants, which are moisture curable. In these systems, the resin component is a polyurethane prepolymer prepared by the reaction of an organic polyisocyanate (including diisocyanates) with an aliphatic polyol, generally a mixture of aliphatic diols and triols. The prepolymers may be isocyanate terminated or may be "capped" by other end groups, for example alkoxysilane terminals. The aliphatic polyols may include polyester polyols as well as polyether polyols, the latter being preferred. Particularly preferred materials are polyoxyalkylene ethers such as the polyoxypropyl ether diols and triols. For formulating the sealant, the prepolymer is again suitably combined with fillers such as carbon black, clay, talc, and other materials well known in the formulating art to affect rheological and elastomeric properties. Compositions of this type are reactive with moisture and will cure on exposure to air. Prior to use, they are commonly sealed in airtight containers.

To accelerate the cure, the moisture-sensitive sealant may suitably be mixed with an aqueous paste comprising water and inorganic solids such as fillers. The water present in this composition hastens the cure of the sealant, shortening the time required for development of full strength in comparison with the time which would be required if reliant on curing in the presence of atmospheric moisture alone.

Such polyurethane systems are well known in the art and are disclosed, for example, in U.S. Pat. Nos. 3,779,794 and 4,345,053.

A better understanding of the present invention and of its many advantages will be had by referring to the following specific Examples, given by way of illustration.

In each of the following Examples, primer compositions were formulated by dissolving the resin indicated in a solvent, specifically methyethylketone, to give a solids concentration of 20 percent. The resulting solution was divided into portions and differing concentrations of a number of acids were added to different of these portions, retaining some of the original solution as a control. Using a standard drawdown bar, a 5 mil wet film of each such solution was now applied to a steel panel painted with a high solids enamel finish commercially available under the tradename "PPG White WAEV 3967". The primer film was dried for 30 minutes (or longer if necessary) to give a primer coating dry to the touch. A one-quarter inch bead of polyurethane sealant was then applied to the painted and primed panel and the assembly was cured at room temperature in air for 2.7 hours. In each case, the resultant bead was then cut with a razor blade through to the surface and an attempt was made to strip off the bead by pulling. The resultant seals were evaluated as involving either "primer failure" (PF) or "cohesive failure" (CF). In the case of primer failure, the sealant bead and primer film can be removed from the paint surface. In the case of cohesive failure, the bead remains tightly adhered to the primed paint surface and failure occurs by destruction of the polyurethane resin composition of the bead.

The polyurethane sealant employed is prepared by reacting one equivalent part of a polyoxypropylene diol with slightly more than two equivalent parts of diphenylmethane-4,4'-diisocyanate under nitrogen at a temperature of about 80° C. to produce an isocyanato-terminated prepolymer containing about 3.5 percent by weight of excess isocyanate groups. This is cooled and combined with about 10 equivalent percent of a polypropylene ether triol and a dialkylphthalate plasticizer. This mixture is heated at about 60° C. until the free isocyanate in the product is 1.5 percent by weight. A sealant composition is next formulated by the addition of carbon black, clay, and an organometallic salt catalyst to the prepolymer. The composition contains about 52 percent by weight of the prepolymer, 15 percent of carbon black, 28 percent of clay, 1 percent of catalyst, and sufficient toluene to bring the mixture to 100 percent. For rapid curing, e.g. to facilitate testing, the sealant was combined with a water/filler paste just prior to use. However, the sealant was also cured solely under the influence of atmospheric moisture to give equivalent test results in about 72 hours.

EXAMPLE 1

A partially hydrolyzed copolymer of vinyl chloride and vinyl acetate containing 90 percent of vinyl chloride, 4 percent of vinyl acetate, and 2.3 percent of hydroxy groups was combined in each case with the following amount of acid, stated as a percent by weight of the resin. After application and drying and the bonding of a urethane seal thereto, the seal was tested for failure in the manner described earlier herein with the following results.

| | |
|---|---|
| Resin alone (MEK solvent) | PF |
| Resin/MEK + 1.0% paratoluene sulfonic acid (100%) | CF |
| Resin/MEK + 1.5% hydrochloric acid (conc., 37%) | CF |
| Resin/MEK + 3.0% phosphoric acid (85%) | CF |
| Resin/MEK + 1.0% dinonylnaphthalene disulfonic acid (100%) | CF |

(The same results are obtained if the sealant is cured over a period of 72 hours under the influence of atmospheric moisture only, i.e. without the addition of water.) The amounts of acid employed in this Example are the preferred amounts for the acids indicated except for hydrochloric acid, which is preferably used at about 0.5 percent. The limits within which the acids are generally employed are reported below as a percentage by weight of the resin with which they are combined:

| | |
|---|---|
| Paratoluene sulfonic acid (100%) | 0.25–2.5%, |
| Hydrochloric acid (37%) | 0.25–3.5%, |
| Phosphoric acid (85%) | 1.5–5%, |
| Acetic acid (glacial) | 3.0–15%, |
| Sulfuric acid (98%) | 0.25–2.5%, and |
| Dinonylnaphthalene disulfonic acid (DNNDSA) | 0.25–10%. |

EXAMPLE 2

The resin employed in the present invention was similarly a partially hydrolyzed copolymer of vinyl chloride on vinyl acetate comprising 80 percent of vinyl chloride, 5 percent of vinyl acetate, and 2 percent of hydroxy groups. The resin alone, applied in a solution in MEK was rated PF. With the addition of 1.0 percent of paratoluene sulfonic acid, by weight of the resin, cohesive failure in the applied polyurethane seal was observed.

What is claimed is:

1. A primer composition adaptable to application to a painted surface to improve the adhesion of a sealant composition to said surface, said composition comprising a solution, in a volatile solvent, of an hydroxy functional film forming and at least 0.25 percent of a strong acid, by weight of said resin.

2. A composition as in claim 1 wherein said strong acid is an organic sulfonic acid.

3. A composition as in claim 1 wherein said acid is paratoluene sulfonic acid.

4. A composition as in claim 1 wherein said resin is a terpolymer comprising about 80 to about 90 percent by weight of vinyl chloride and about 4 to 5 percent by weight of vinyl acetate, the balance being hydrolyzed vinyl acetate to give an hydroxy content of at least 2 percent by weight.

5. A composition as in claim 1 which is a solution of (1) a terpolymer comprising about 80 percent by weight of vinyl chloride, about 4 percent by weight of vinyl acetate, the balance being hydrolyzed vinyl acetate, said terpolymer containing about 2.3 percent by weight of hydroxy groups, and (2) 1 percent of paratoluenesulfonic acid, by weight of said terpolymer.

* * * * *